US012282942B2

(12) United States Patent
Sakai (10) Patent No.: US 12,282,942 B2
(45) Date of Patent: Apr. 22, 2025

(54) SELECTION DEVICE AND SELECTION METHOD FOR MOTOR AND AMPLIFIER
(71) Applicant: FANUC CORPORATION, Yamanashi (JP)
(72) Inventor: Koujirou Sakai, Yamanashi-ken (JP)
(73) Assignee: FANUC CORPORATION, Yamanashi (JP)
(*) Notice: Subject to any disclaimer, the term of this patent is extended or adjusted under 35 U.S.C. 154(b) by 335 days.
(21) Appl. No.: 17/800,974
(22) PCT Filed: Feb. 24, 2021
(86) PCT No.: PCT/JP2021/006841
§ 371 (c)(1),
(2) Date: Aug. 19, 2022
(87) PCT Pub. No.: WO2021/172347
PCT Pub. Date: Sep. 2, 2021

(65) Prior Publication Data
US 2023/0064138 A1 Mar. 2, 2023

(30) Foreign Application Priority Data
Feb. 28, 2020 (JP) ................. 2020-032556

(51) Int. Cl.
G05B 17/02 (2006.01)
G06Q 30/0283 (2023.01)
H02P 29/00 (2016.01)
(52) U.S. Cl.
CPC ......... G06Q 30/0283 (2013.01); G05B 17/02 (2013.01); H02P 29/00 (2013.01)
(58) Field of Classification Search
CPC ..................................... H02P 29/00
See application file for complete search history.

(56) References Cited
U.S. PATENT DOCUMENTS
5,943,245 A * 8/1999 Melfi ............... G06F 30/00
700/32
2005/0246152 A1* 11/2005 Kokatsu ......... G06Q 30/0623
703/22
(Continued)

FOREIGN PATENT DOCUMENTS
JP 2009204600 A 9/2009
JP 2011008642 A 1/2011
(Continued)

OTHER PUBLICATIONS
International Search Report issued by the Japanese Patent Office acting as the International Searching Authority in relation to International Application No. PCT/JP2021/006841 dated Apr. 20, 2021 (3 pages) along with English language translation (2 pages).
(Continued)

Primary Examiner — Nathan L Laughlin
(74) Attorney, Agent, or Firm — Robert P. Michal, Esq.; Carter, DeLuca & Farrell LLP (57) ABSTRACT Provided are a selection device and a selection method for enabling an operator to efficiently select an amplifier capable of driving a motor having a desired performance, said selection being made from the perspective of the number of amplifiers installed, the price, or the installation space. This selection device for selecting an amplifier and a motor is provided with: a storage unit for storing the motor performance for each of a plurality of motors and, for each of a plurality of amplifiers, the number of control shafts and/or the price and/or the installation space of the amplifier, as well as the performance of the motors that can be driven; an input unit for enabling an operator to input selection information; a motor selection unit for selecting a motor satisfying a condition; an amplifier selection unit for selecting one or more amplifiers for driving the required number of motors satisfying the condition, said selection being made so as to minimize the total number installed, the total price, or the total installation space; and a display unit for displaying the selected motor and the selected amplifiers.

10 Claims, 5 Drawing Sheets (56) References Cited

U.S. PATENT DOCUMENTS

| | | | |
|---|---|---|---|
| 2015/0242923 A1* | 8/2015 | Kreidler | G06Q 30/0623 705/26.61 |
| 2017/0141581 A1* | 5/2017 | Yamamoto | G06Q 10/06 |
| 2018/0299838 A1* | 10/2018 | Ueda | G05B 15/02 |
| 2019/0095966 A1 | 3/2019 | Chen | |

FOREIGN PATENT DOCUMENTS

| | | | |
|---|---|---|---|
| JP | 2019057963 A | 4/2019 |
| JP | 2019058046 A | 4/2019 |
| WO | 2019186748 A1 | 10/2019 |

OTHER PUBLICATIONS

Written Opinion of the International Searching Authority issued by the Japanese Patent Office acting as the International Searching Authority in relation to International Application No. PCT/JP2021/006841 dated Apr. 20, 2021 (4 pages).

Sew Eurodrive, DR..71~315, DRN80~315, [online], 2016, pp. 22-28, [retrived on Apr. 1, 2021] Internet<URL: http://douwnload.sew-eurodrive.com/download/pdf/22760547.pdf, pp. 22-28, (instruction manual, three-phase AC motor) along with English language translation, 14 total pages.

Office Action dated May 16, 2024, issued by the U.S. Patent and Trademark Office in related U.S. Appl. No. 17/800,948, 7 pages.

* cited by examiner

| MOTOR IDENTIFICATION INFORMATION | CONTINUOUS RATED CURRENT [A] | CONTINUOUS TORQUE [Nm] | MAXIMUM TORQUE [Nm] |
|---|---|---|---|
| MOTOR A | 20 | 1 | 5.3 |
| MOTOR B | 20 | 2 | 8.3 |
| MOTOR C | 40 | 4 | 15 |
| MOTOR D | 80 | 8 | 32 |
| MOTOR E | 80 | 12 | 35 |

FIG. 4

| AMPLIFIER IDENTIFICATION INFORMATION | CONTINUOUS RATED CURRENT (CONTROL AXIS 1) [A] | CONTINUOUS RATED CURRENT (CONTROL AXIS 2) [A] | PRICE | EXTERNAL DIMENSIONS W/H/D |
|---|---|---|---|---|
| AMPLIFIER A | 20 | — | $P_A$ | $W_A/H_A/D_A$ |
| AMPLIFIER B | 20 | 20 | $P_B$ | $W_B/H_B/D_B$ |
| AMPLIFIER C | 40 | — | $P_C$ | $W_C/H_C/D_C$ |
| AMPLIFIER D | 80 | — | $P_D$ | $W_D/H_D/D_D$ |
| AMPLIFIER E | 80 | 80 | $P_E$ | $W_E/H_E/D_E$ |

FIG. 5

SELECTION DEVICE AND SELECTION METHOD FOR MOTOR AND AMPLIFIER

CROSS-REFERENCE TO RELATED APPLICATIONS

This application is a national phase entry under 35 U.S.C. 371 of PCT International Application No. PCT/JP2021/006841, filed Feb. 24, 2021, which claims priority to Japanese Patent Application No. 2020-032556, filed Feb. 28, 2020, the disclosure of each of these applications is expressly incorporated herein by reference in their entirety.

TECHNICAL FIELD

The present invention relates to a selection device. In particular, the present invention relates to a selection device and a selection method for selecting a motor and an amplifier.

BACKGROUND ART

A selection device has been proposed, which selects a motor having a performance desired by an operator, and an amplifier that is capable of driving the motor. An example of such a selection device is disclosed, for example, in JP 2019-058046 A.

SUMMARY OF THE INVENTION

The existing selection device, in order to comply with a demand of "selecting an amplifier that is capable of driving the motor," in all cases, serves to select an amplifier from the standpoint of "whether or not the amplifier corresponds to the performance of the motor".

Accordingly, for example, even if a necessary number of the motors is two, a single-axis amplifier could be selected, so long as such a motor were capable of being driven in terms of the performance of the motor. In this case, in comparison with a case in which a multi-axis amplifier is used, a total number of installations of the amplifiers is increased. Further, although the price and installation space are sometimes regarded by the operator as important standpoints when operating the amplifier, the existing selection device does not serve to select the amplifier in consideration of these standpoints.

Due to the facts mentioned above, it has not been easy for the operator to efficiently select an amplifier that is capable of driving a motor having a desired performance, in terms of the number of installations, the price, or the installation space of the amplifier.

Thus, the present invention has the object of providing a selection device and a selection method for efficiently selecting an amplifier capable of driving a motor having a performance desired by an operator, in terms of the number of installations, the price, or the installation space of the amplifier.

One aspect of the present invention is characterized by a selection device that, when an operator inputs selection information, selects a motor and an amplifier based on the selection information, the selection information including a necessary number and conditions related to performance of the motor, the selection device comprising a storage unit configured to store the performance of the motor for each of a plurality of the motors, and store, for each of a plurality of the amplifiers, at least one of a number of control axes, a price, or an installation space of the amplifier, and the performance of the motor drivable by the amplifier, an input unit with which the operator inputs the selection information, a motor selection unit configured to, by referring to the storage unit, select the motor satisfying the conditions, an amplifier selection unit configured to, by referring to the storage unit, select one or more of the amplifiers to drive the necessary number of the motor satisfying the conditions, in a manner so as to minimize a total number of installations, a total price, or a total installation space of the amplifier, and a display unit configured to display the motor that has been selected and the amplifier that has been selected.

Another aspect of the present invention is characterized by a selection method for selecting, when an operator inputs selection information, a motor and an amplifier based on the selection information, the selection information including a necessary number and conditions related to performance of the motor, the selection method comprising a storage step of storing the performance of the motor for each of a plurality of the motors, and storing, for each of a plurality of the amplifiers, at least one of a number of control axes, a price, or an installation space of the amplifier, and the performance of the motor drivable by the amplifier, an input step of inputting the selection information by the operator, a motor selection step of selecting, based on the information stored in the storage step, the motor satisfying the conditions, an amplifier selection step of selecting, based on the information stored in the storage step, one or more of the amplifiers to drive the necessary number of the motor satisfying the conditions, in a manner so as to minimize a total number of installations, a total price, or a total installation space of the amplifier, and a display step of displaying the motor that has been selected and the amplifier that has been selected.

According to the aspects of the present invention, a selection device and a selection method are provided, which efficiently select an amplifier capable of driving a motor having a performance desired by an operator, in terms of the number of installations, the price, or the installation space of the amplifier.

DESCRIPTION OF THE INVENTION

A preferred embodiment in relation to a selection device and a selection method according to the present invention will be presented and described in detail below with reference to the accompanying drawings.

Embodiment

Figure 1:
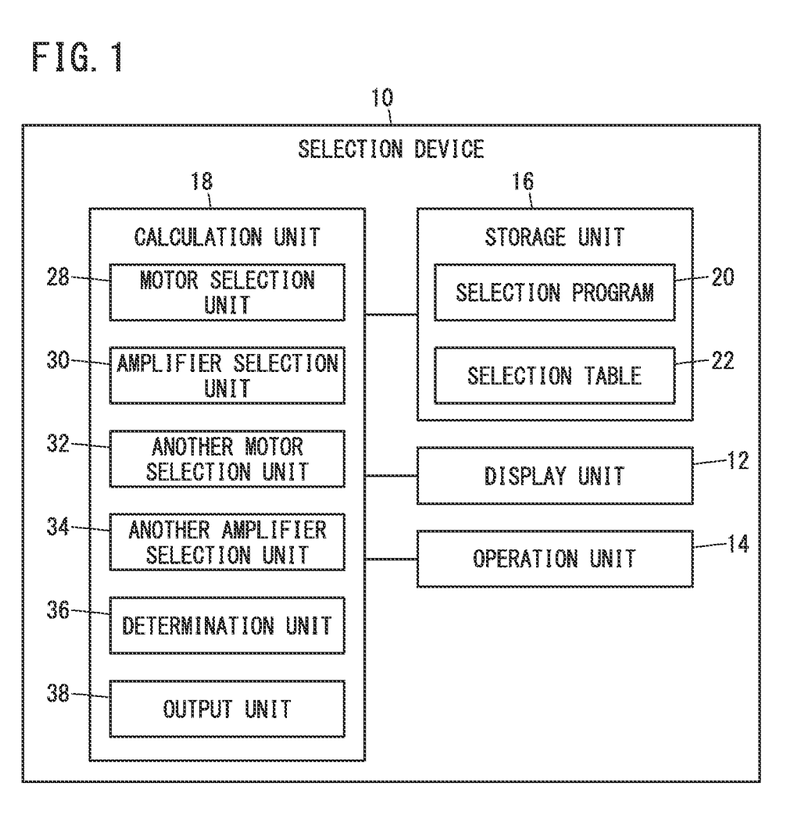
FIG. 1 is a schematic configuration diagram of a selection device according to an embodiment of the present invention.

FIG. 1 is a schematic configuration diagram of a selection device 10 according to an embodiment.

The selection device 10 is an electronic device (a computer) which is provided in order to easily construct a servo mechanism (a servo system) including a servo motor and a servo amplifier. The selection device 10 according to the present embodiment is equipped with a display unit 12, an operation unit (input unit) 14, a storage unit 16, and a calculation unit 18. Hereinafter, descriptions will be given sequentially concerning these configurations. Moreover, hereinafter, the term "servo motor" may also simply be referred to as a "motor", and the term "servo amplifier" may also simply be referred to as an "amplifier".

The display unit 12 is a display device having a screen for displaying information. Although the screen of the display unit 12 is not limited to this feature, for example, the screen may be a liquid crystal screen. An input screen provided for inputting later-described selection information, and a selection result are displayed on the display unit 12.

The operation unit 14 is provided in order to allow an operator to input information to the selection device 10, and is constituted, for example, by a keyboard, a mouse, or a touch panel that is attached to the screen of the display unit 12. By operating the operation unit 14, the operator is capable of inputting the selection information to the selection device 10.

The storage unit 16 serves to store information. The storage unit 16 is constituted by hardware such as, for example, a RAM (Random Access Memory), and a ROM (Read Only Memory). The storage unit 16 stores a predetermined selection program 20 and a predetermined selection table 22.

The selection program 20 is a program that specifies a selection method for selecting a motor and an amplifier on the basis of the selection information, when an operator inputs the selection information including conditions related to the performance of the motor and the necessary number of the motors. The details of such a selection method will be described later.

Figure 2:
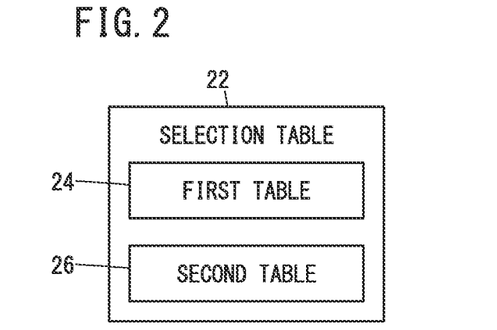
FIG. 2 is a configuration diagram of a selection table.

FIG. 2 is a configuration diagram of the selection table 22.

The selection table 22 is a table in which there is specified a plurality of information necessary when the selection method is executed. The selection table 22 according to the present embodiment includes a first table 24 and a second table 26, which will be described hereinafter.

The first table 24 is a table in which a plurality of motors, and information indicative of the performance of each of the plurality of motors, are specified. The information indicative of the performance of the motors, for example, is a value of a continuous rated current of the motors. However, the information indicative of the performance of the motors is not necessarily limited to this feature, and may be a value of a continuous torque (a continuous rated torque), a maximum torque, a continuous output (a continuous rated output), a maximum output, or a maximum speed of the motors.

Figure 3:
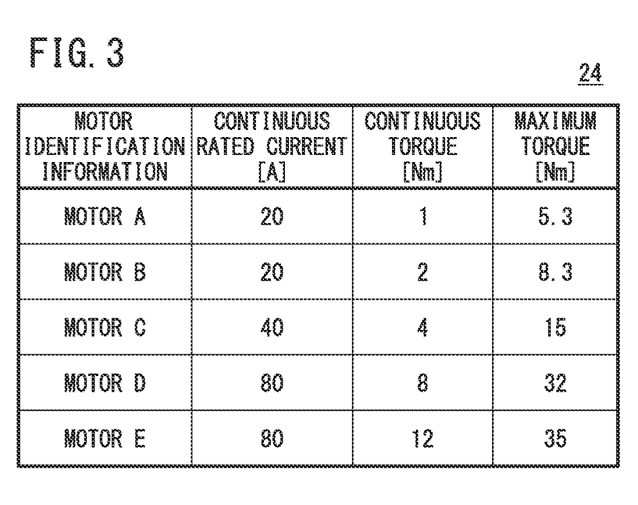
FIG. 3 is a table showing an example of a configuration of a first table.

FIG. 3 is a table showing an example of a configuration of the first table 24.

In FIG. 3, the first table 24 is illustrated in which values of the continuous rated current, the continuous torque, and the maximum torque are specified as the information indicative of the performance of the motor. In the configuration of the first table 24, motor identification information indicative of the names or the control numbers of a plurality of motors A to E is specified in the left column, and values of the continuous rated current, the continuous torque, and the maximum torque of the motors A to E are specified on the right side of the motor identification information.

According to FIG. 3, for example, it can be understood that the continuous rated current of the motor A is 20 A (amperes), the continuous torque of the motor A is 1 Nm (Newton meters), and the maximum torque of the motor A is 5.3 Nm. Further, it can be understood, for example, that the continuous rated current of the motor C is 40 A, the continuous torque of the motor C is 4 Nm, and the maximum torque of the motor C is 15 Nm.

Next, a description will be given concerning the second table 26. The second table 26 is a table in which, concerning each of the plurality of amplifiers, at least one of the number of control axes, the price, or the installation space, and information indicative of the performance of the motors that are capable of being driven thereby, are specified.

From among the information specified in the second table 26, the information indicative of the performance of the motors that are capable of being driven is information that associates the plurality of amplifiers specified in the second table 26, with the plurality of motors specified in the first table 24. For example, it is assumed that values of the continuous rated current are specified in the first table 24 as information indicative of the performance of the motors. In this case, the values of the continuous rated current are specified in the second table 26 as information indicative of the performance of the motors that are capable of being driven.

Figure 4:
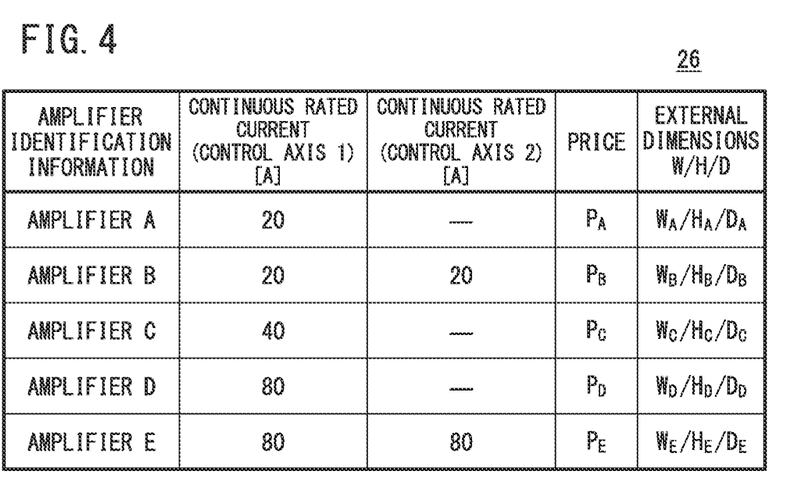
FIG. 4 is a table showing an example of a configuration of a second table.

FIG. 4 is a table showing an example of a configuration of the second table 26.

In the configuration of the second table 26 illustrated in FIG. 4, the amplifier identification information indicative of the names or the control numbers of the amplifiers A to E is specified in the left column. Further, the price of the amplifiers A to E, the installation space of the amplifiers (the dimensions of the amplifiers), and the values of the continuous rated current as information indicative of the performance of the motors that are capable of being driven thereby, are specified alongside one another on the right side of the amplifier identification information. In the configuration shown in FIG. 4, the number of the columns in which the values of the continuous rated current are shown is determined in accordance with the number of the control axes of the corresponding amplifiers.

According to FIG. 4, for example, it can be understood that the amplifier A is an amplifier with a price of $P_A$, and an installation space of $W_A/H_A/D_A$ (W: width, H: height, D: depth), and that the amplifier A is equipped with one control axis that is capable of supplying a continuous rated current of 20 A. Further, for example, it can be understood that the amplifier B is a multi-axis amplifier equipped with two control axes that are capable of supplying a continuous rated current of 20 A.

Returning to FIG. 1, a description will be given next concerning the calculation unit 18. The calculation unit 18 processes information by carrying out computations. The calculation unit 18 is constituted by hardware, for example, such as a CPU (Central Processing Unit) and a GPU (Graphics Processing Unit).

Further, the calculation unit 18 according to the present embodiment is equipped with a motor selection unit 28, an amplifier selection unit 30, an another motor selection unit 32, an another amplifier selection unit 34, a determination unit 36, and an output unit 38. These respective units can be realized by the calculation unit 18 reading in and executing the above-described selection program 20.

When the operator inputs the selection information to the selection device 10 (the calculation unit 18) via the operation unit 14, the motor selection unit 28 selects a motor on the basis of the input selection information, by referring to the storage unit 16.

Hereinafter, a motor that satisfies the conditions of the selection information is also referred to as a "motor α" in order to distinguish it from the other motors.

In this instance, the term "selection information" will be described. The selection information is information that includes at least a condition related to the performance of the motors and a necessary number of the motors. The condition related to the performance of the motors is a value, or alternatively, a range of values specified for the aforementioned continuous rated current or the like. The necessary number is a number, desired by the operator, of the motors α satisfying the conditions of the selection information.

Moreover, in the following, when the term "necessary number" is referred to simply, unless otherwise specified, the term indicates "a necessary number of the motors α".

By referring to the first table 24 of the storage unit 16, the motor selection unit 28 easily selects the motor α that satisfies the conditions of the selection information. For example, it is assumed that a condition of the selection information is a "continuous rated current of 40 A". According to FIG. 3, the motor satisfying such a condition is the motor C. In this case, the motor selection unit 28 selects the motor C as the motor α.

By referring to the storage unit 16, the amplifier selection unit 30 selects one or more amplifiers for driving the motor α, in a manner so as to minimize the total number of installations, the total price, or the total installation space of the amplifiers.

Hereinafter, the amplifier that is capable of driving the motor α is also referred to as an "amplifier β" in order to distinguish it from the other amplifiers.

For example, it is assumed that the motor selection unit 28 has selected the motor D. According to FIG. 3, the continuous rated current of the motor D is 80 A. According to FIG. 4, the amplifiers capable of driving the motor D are the amplifier D equipped with one control axis capable of supplying a continuous rated current of 80 A, and the amplifier E equipped with two control axes capable of supplying a continuous rated current of 80 A.

In this instance, in selecting the amplifier, it is assumed that the necessary number is two, and the total number of installations of the amplifiers is included as the target to be minimized. In this case, if one amplifier E equipped with two control axes is selected, the total number of installations of the amplifiers becomes one, which is the minimum number. Therefore, in this case, the amplifier selection unit 30 selects one amplifier E as the amplifier β.

Which one of the total number of installations, the total price, or the total installation space is to be minimized may be decided at a manufacturing design stage of the selection device 10, or may be designated in advance by the operator prior to making the selection. By allowing the operator to make such a designation, convenience for the operator can be achieved. In that case, the designation may be included in the selection information.

Further, in the case that the total installation space is to be minimized, the amplifier selection unit 30 may minimize the volume of the amplifiers β (the total volume of the plurality of amplifiers β), or when the amplifiers β are installed on an installation surface such as a floor, may minimize the area of the amplifiers β (the total area of the plurality of amplifiers β) with respect to the installation surface. In this case, the operator may be able to designate which one of the volume or the area is to be minimized.

In addition, the amplifier selection unit 30 may select the amplifier β on the basis of a predetermined priority among the total number of installations, the total price, and the total installation space. For example, in the case that the priority of the total number of installations is higher than the priority of the total price, the amplifier selection unit 30 initially selects the amplifier β (a combination of the amplifiers β) that drives the necessary number of the motors α, in a manner so that the total number of installations and the total number of the control axes are minimized. Then, from among them, the amplifier β (the combination of the amplifiers β) that drives the necessary number of the motors α is further selected, in a manner so that the total price and the total number of the control axes are minimized.

The priority may be determined at the manufacturing design stage of the selection device 10, or may be designated by the operator via the operation unit 14. By allowing the operator to make such a designation, convenience for the operator can be achieved. In that case, the designation may be included in the selection information.

The amplifier selection unit 30 selects one or more amplifiers β in the manner described above.

By referring to the storage unit 16, the another motor selection unit 32 selects another motor whose output is more suppressed than that of the motor α. More specifically, the another motor selection unit 32 selects another motor having a continuous torque or a maximum torque which is smaller than and nearest to that of the motor α.

Hereinafter, the aforementioned "another motor" is also referred to as a "motor α'" in order to distinguish it from the other motors including the "motor α".

Whether to select the motor α' on the basis of the continuous torque or the maximum torque may be decided at the manufacturing design stage of the selection device 10, or may be designated in advance by the operator prior to making the selection. By allowing the operator to make such a designation, convenience for the operator can be achieved. In that case, the designation may be included in the selection information.

The another motor selection unit 32 easily selects the motor α' by referring to the first table 24 of the storage unit 16. For example, in the case that the first table 24 is as shown in FIG. 3 and the another motor selection unit 32 selects the motor α' on the basis of the continuous torque, it is assumed that the motor selection unit 28 has selected the motor D as the motor α. According to FIG. 3, it is the motor C whose continuous torque (continuous torque: 4 Nm) is smaller than and nearest to that of the continuous torque (8 Nm) of the motor D. In this case, the another motor selection unit 32 selects the motor C as the motor α'.

Moreover, the another motor selection unit 32 is not limited to using the continuous rated torque or the maximum torque, and may select, as the motor α', the other motor having a continuous output or a maximum output which is smaller than and nearest to that of the motor α. In that case, the motor α' can be selected on the basis of the continuous rated output and the maximum output of the motor, by specifying as necessary the continuous output and the maximum output of the motor in the selection table 22.

By referring to the storage unit 16, the another amplifier selection unit 34 selects one or more amplifiers for driving the motor α', in a manner so as to minimize the total number of installations, the total price, or the total installation space of the amplifiers.

Hereinafter, the amplifier that is capable of driving the motor α' is also referred to as an "amplifier β'" in order to distinguish it from the other amplifiers.

The selection by the another amplifier selection unit 34 can be performed in the same manner as the selection of the amplifier β by the amplifier selection unit 30. For example, it is assumed that the another motor selection unit 32 selects the motor A. According to FIG. 3, the continuous rated current of the motor A is 20 A. Further, according to FIG. 4, the amplifiers that are capable of driving the motor A are the amplifier A and the amplifier B.

In this instance, in selecting the amplifier, it is assumed that the necessary number is two, and the number of installations of the amplifiers is included as the target to be minimized. In this case, the another amplifier selection unit 34 selects the amplifier B having a minimum total number of installations of one as the amplifier β'.

Moreover, as a result, the amplifier β' selected by the another amplifier selection unit 34 may be the same amplifier as the amplifier β selected by the amplifier selection unit 30.

By referring to the storage unit 16, the determination unit 36 determines whether or not the total number of installations, the total price, or the total installation space is reduced by changing the amplifier β to the amplifier β'.

Hereinafter, an example will be given with reference to FIGS. 3 and 4 concerning the determination carried out by the determination unit 36. For example, in the selection of the amplifier, in the case that the total number of installations is included as the target to be minimized, it is assumed that the motor C is selected as the motor α and the amplifier C is selected as the amplifier β. Further, it is assumed that the necessary number is two. From the fact that the amplifier C is a single-axis amplifier, the total number of installations at the time when the two motors C are driven is two.

In addition, in the same case, it is assumed that the motor B is selected as the motor α' and the amplifier B is selected as the amplifier β'. From the fact that the amplifier B is a multi-axis amplifier equipped with two control axes, the total number of installations at the time when the two motors B are driven is only one.

In such a case, the determination unit 36 determines that the total number of installations is reduced by changing the amplifier β to the amplifier β' (prior to the change: two, after the change: one).

The output unit 38 outputs information indicative of the motor α and the amplifier β to the display unit 12 as a selection result. Further, in the case that the determination unit 36 determines that the total number of installations, the total price, or the total installation space is reduced by changing the amplifier β to the amplifier β', then the output unit 38 further outputs information to that effect (the motor α' and the amplifier β').

The above is an example of the configuration of the selection device 10 according to the present embodiment. Next, a description will be given concerning the selection method which is executed by the selection device 10 described above.

Figure 5:
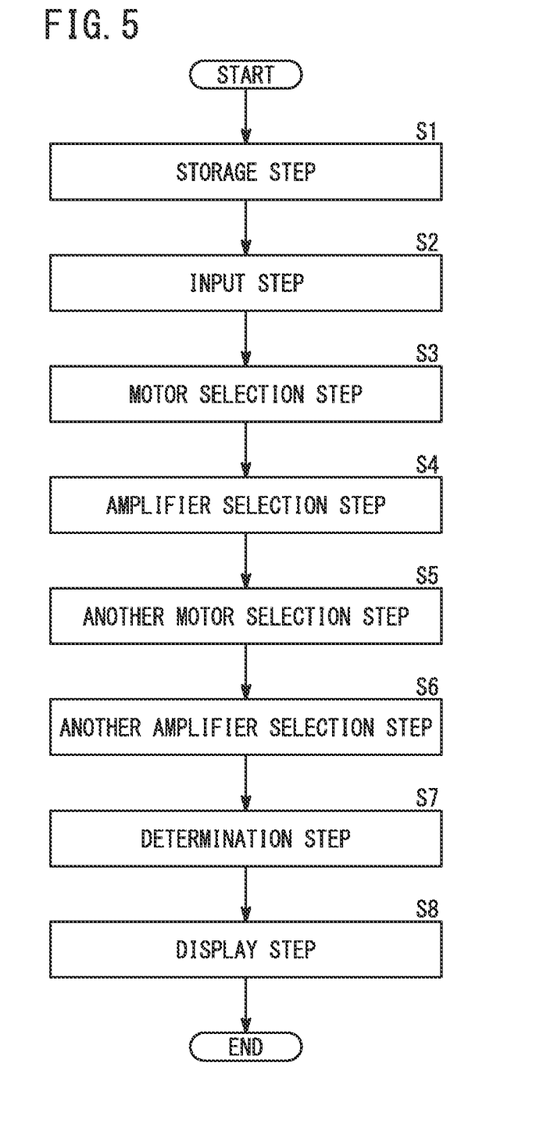
FIG. 5 is a flowchart illustrating a process flow of a selection method according to the embodiment.

FIG. 5 is a flowchart illustrating a process flow of the selection method according to the embodiment.

As discussed previously, the selection method of the present embodiment is a method for selecting a motor and an amplifier on the basis of the selection information. As illustrated in FIG. 5, the selection method includes a storage step (step S1), an input step (step S2), a motor selection step (step S3), an amplifier selection step (step S4), and a display step (step S8). In addition, the selection method according to the present embodiment further includes an another motor selection step (step S5), an another amplifier selection step (step S6), and a determination step (step S7), which are carried out between the amplifier selection step (step S4) and the display step (step S8).

The storage step is a step of storing a motor performance for each of a plurality of motors, and storing, for each of a plurality of amplifiers, at least one of the number of control axes, a price, or an installation space of the amplifier, and a performance of the motor that can be driven thereby. These pieces of information are stored in the storage unit 16 as information constituting the selection table 22.

The information stored in the storage step as the performance of the motor is not limited to the information described above, but may be, for example, values of the continuous rated current, the continuous torque, the maximum torque, the continuous output, the maximum output, and the maximum speed of the motor. In the case that the another amplifier selection step and the determination step are included in the selection method as in the present embodiment, at least one of the continuous torque, the maximum torque, the continuous output, or the maximum output is stored.

The input step is a step in which the operator inputs the selection information. This inputting operation is performed on the selection device 10 (the calculation unit 18) via the operation unit 14. As discussed previously, the selection information includes the conditions specified by the operator concerning the performance of the motor, and a designation of the necessary number. Further, the selection information may include a designation specifying which of the total number of installations, the total price, and the total installation space is to be minimized, or a designation of a priority in which these items are minimized in the selection of the amplifier.

The motor selection step is a step of selecting, on the basis of the information stored in the storage step, the motor α that satisfies the conditions of the selection information that has been input in the input step. The motor selection step is executed by the motor selection unit 28. The motor selection unit 28 easily selects the motor α by referring to the first table 24.

The amplifier selection step is a step of selecting one or more amplifiers β for driving the motor α on the basis of the information stored in the storage step, in a manner so as to minimize the total number of installations, the total price, or the total installation space. The amplifier selection step is executed by the amplifier selection unit 30. The amplifier selection unit 30 easily selects the amplifier β by referring to the second table 26. At this time, if a designation of the target to be minimized and a designation of the priority are included in the selection information, the amplifier selection unit 30 selects the amplifier β on the basis of the designation.

The another motor selection step is a step of selecting, on the basis of the information stored in the storage step, another motor α' having a continuous rated torque, a maximum torque, a continuous output, or a maximum output which is smaller than and nearest to that of the motor α. The another motor selection step is executed by the another motor selection unit 32. The another motor selection unit 32 easily selects the motor α' by referring to the first table 24. At this time, if a designation, which indicates that any one of the continuous torque, the maximum torque, the continuous output, or the maximum output is to be regarded as a criteria for selecting the motor α', is included in the selection information, then the another motor selection unit 32 selects the motor α' on the basis the designation.

The another amplifier selection step is a step of selecting the amplifier β' that is capable of driving the motor α', in a manner so as to minimize the total number of installations, the total price, or the total installation space. The another amplifier selection step is executed by the another amplifier selection unit 34. The another amplifier selection unit 34 easily selects the amplifier β' by referring to the second table 26. At this time, if a designation of the target to be minimized and a designation of the priority are included in the selection information, the another amplifier selection unit 34 selects the amplifier β' on the basis the designation.

The determination step is a step of determining whether or not the total number of installations, the total price, or the total installation space is reduced by changing the amplifier β to the amplifier β', on the basis of the information stored in the storage step. The determination step is executed by the determination unit 36.

The display step is a step of displaying the motor α and the amplifier β on the display unit 12. Further, in the case it is determined in the determination step that the total number of installations, the total price, or the total installation space is reduced by changing, respectively, the motor α to the motor α' and the amplifier β to the amplifier β', a display to that effect is further provided in the display step. The display step is executed by the output unit 38.

The above is an example of the configuration of the selection method executed by the selection device 10 according to the present embodiment. As noted previously, according to the present embodiment, the selection device 10 and the selection method are provided, which efficiently select the amplifier β capable of driving the motor α having a performance desired by the operator, in terms of the number of installations, the price, or the installation space of the amplifier.

More specifically, by the selection device 10 and the selection method according to the present embodiment, the operator is capable of easily grasping the motor α having the desired performance and one or more amplifiers β (a combination of the plurality of amplifiers β) capable of driving the motor α. In addition, the one or more amplifiers β are selected in a manner so as to minimize the total number of installations, the total price, or the total installation space. Accordingly, the operator is capable of easily constructing an efficient servo mechanism.

Further, in the selection device 10 and the selection method according to the present embodiment, in accordance with the result of the determination made in the determination step, the motor α', and the amplifier β' that drives the motor α' are further shown to the operator.

The motor α' shown to the operator is a motor whose torque and output are more suppressed than those of the motor α that is selected on the basis of the conditions of the selection information, and the motor α' does not have the performance originally desired by the operator. However, when the motor α' and the amplifier β' are used, the operator, while maintaining the necessary number of the motors, is capable of making the total number of installations, the total price, or the total installation space of the amplifiers smaller than a case in which the motor α and the amplifier β are used.

Accordingly, by showing the motor α' and the amplifier β' to the operator, the selection device 10 can contribute to an investigation when the operator constructs a more efficient servo mechanism in terms of the total number of installations, the total price, or the total installation space of the amplifiers.

[Modification]

The embodiment has been described above as one example of the present invention. It goes without saying that various modifications or improvements are capable of being added to the above-described embodiment. Further, it is clear from the scope of the claims that other modes to which such modifications or improvements have been added can be included within the technical scope of the present invention.

Exemplary Modification 1

In the case it is unnecessary to select the motor α' and the amplifier β', the another motor selection unit 32 and the another amplifier selection unit 34 described in the embodiment may be omitted from the configuration of the selection device 10. In accordance with this feature, the configuration of the selection device 10 can be made simpler.

[Inventions that can be Obtained from the Embodiment]

The inventions that can be grasped from the above-described embodiment and the modification thereof will be described below.

First Invention

The present invention is characterized by the selection device (10) that, when the operator inputs the selection information, selects a motor and an amplifier based on the selection information, the selection information including the necessary number and the conditions related to the performance of the motor, the selection device comprising the storage unit (16) that stores the performance of the motor for each of the plurality of motors, and stores, for each of the plurality of amplifiers, at least one of the number of control axes, the price, or the installation space of the amplifier, and the performance of the motor that is capable of being driven by the amplifier, the input unit (14) with which the operator inputs the selection information, the motor selection unit (28) which, by referring to the storage unit (16), selects the motor (α) satisfying the conditions, the amplifier selection unit (30) which, by referring to the storage unit (16), selects one or more of the amplifiers (β) to drive the necessary number of the motor (α) satisfying the conditions, in a manner so as to minimize the total number of installations, the total price, or the total installation space of the amplifier, and the display unit (12) that displays the motor (α) that has been selected and the amplifier (β) that has been selected.

In accordance with such features, the selection device (10) is provided, which efficiently selects the amplifier (β) capable of driving the motor (α) having the performance desired by the operator, in terms of the number of installations, the price, or the installation space of the amplifier.

The selection information may further include a designation of any one from among the total number of installations, the total price, and the total installation space which are stored in the storage unit (16), and the amplifier selection unit (30) may select the amplifier (β) based on the designation. In accordance with this feature, convenience for the operator can be achieved.

The amplifier selection unit (30) may select the amplifier (β) based on a predetermined priority among the total number of installations, the total price, and the total installation space. In accordance with this feature, convenience for the operator can be achieved.

The selection information may further include a designation of the priority, and the amplifier selection unit (30) may select the amplifier (β) based on the designation. In accordance with this feature, convenience for the operator can be achieved.

The storage unit (16) may further store, for each of the plurality of motors, at least one of the continuous rated torque, the maximum torque, the continuous rated output, or the maximum output of the motor, and the selection device (10) may further comprise the another motor selection unit (32) which, by referring to the storage unit (16), selects another motor (α') the continuous rated torque, the maximum torque, the continuous rated output, or the maximum output of which is smaller than and nearest to that of the motor (α) selected by the motor selection unit (28), the another amplifier selection unit (34) which, by referring to the storage unit (16), selects one or more of the amplifiers (β') to drive the necessary number of the other motor (α'), in a manner so as to minimize the total number of installations, the total price, or the total installation space of the amplifier, and the determination unit (36) which, by referring to the storage unit (16), determines whether or not the total number of installations, the total price, or the total installation space is reduced by changing the amplifier (β) selected by the amplifier selection unit (30) to the amplifier (β') selected by the another amplifier selection unit (34), wherein, in the case that the total number of installations, the total price, or the total installation space is reduced by changing, respectively, the motor (α) selected by the motor selection unit (28) to the other motor (α'), and the amplifier (β) selected by the amplifier selection unit (30) to the amplifier (β') selected by the another amplifier selection unit (34), the display unit (12) may provide a display to that effect. In accordance with this feature, convenience for the operator can be achieved.

<Second Invention>

The present invention is characterized by the selection method for selecting, when the operator inputs the selection information, a motor and an amplifier based on the selection information, the selection information including the necessary number and the conditions related to the performance of the motor, the selection method comprising the storage step of storing the performance of the motor for each of the plurality of motors, and storing, for each of the plurality of amplifiers, at least one of the number of control axes, the price, or the installation space of the amplifier, and the performance of the motor that is capable of being driven by the amplifier, the input step of inputting the selection information by the operator, the motor selection step of selecting, based on the information stored in the storage step, the motor (α) satisfying the conditions, the amplifier selection step of selecting, based on the information stored in the storage step, one or more of the amplifiers (β) to drive the necessary number of the motor (α) satisfying the conditions, in a manner so as to minimize the total number of installations, the total price, or the total installation space of the amplifier, and the display step of displaying the motor (α) that has been selected and the amplifier (β) that has been selected.

In accordance with such features, the selection method is provided, which efficiently selects the amplifier (β) capable of driving the motor (α) having the performance desired by the operator, in terms of the number of installations, the price, or the installation space of the amplifier.

The selection information may further include a designation of any one from among the total number of installations, the total price, and the total installation space which are stored in the storage step, and in the amplifier selection step, the amplifier (β) may be selected based on the designation. In accordance with this feature, convenience for the operator can be achieved.

In the amplifier selection step, the amplifier (β) may be selected based on a predetermined priority among the total number of installations, the total price, and the total installation space. In accordance with this feature, convenience for the operator can be achieved.

The selection information may further include a designation of the priority, and in the amplifier selection step, the amplifier (β) may be selected based on the designation. In accordance with this feature, convenience for the operator can be achieved.

In the storage step, for each of the plurality of motors, at least one of the continuous rated torque, the maximum torque, the continuous rated output, or the maximum output of the motor may further be stored, and the selection method may further comprise the another motor selection step of selecting, based on the information stored in the storage step, another motor (α') the continuous rated torque, the maximum torque, the continuous rated output, or the maximum output of which is smaller than and nearest to that of the motor (α) selected in the motor selection step, the another amplifier selection step of selecting, based on the information stored in the storage step, one or more of the amplifiers (β') to drive the necessary number of the other motor (α'), in a manner so as to minimize the total number of installations, the total price, or the total installation space of the amplifier (β'), and the determination step of determining, based on the information stored in the storage step, whether or not the total number of installations, the total price, or the total installation space is reduced by changing the amplifier (β) selected in the amplifier selection step to the amplifier (β') selected in the another amplifier selection step, wherein, in the case that the total number of installations, the total price, or the total installation space is reduced by changing, respectively, the motor (α) selected in the motor selection step to the other motor (α'), and the amplifier (β) selected in the amplifier selection step to the amplifier (β') selected in the another amplifier selection step, then a display to that effect may be provided in the display step. In accordance with this feature, convenience for the operator can be achieved.

The invention claimed is:

1. A selection device that, when an operator inputs selection information, selects a motor, and an amplifier based on the selection information, the selection information including a number and conditions related to performance of the motor, the selection device comprising:
   a storage unit configured to store the performance of the motor for each of a plurality of motors, and store, for each of a plurality of amplifiers, at least one of a number of control axes, a price, or an installation space of the amplifier, and the performance of the motor drivable by the amplifier;
   an input unit with which the operator inputs the selection information;
   a motor selection unit configured to, by referring to the storage unit, select the motor satisfying the conditions;
   an amplifier selection unit configured to, by referring to the storage unit, select one or more of the plurality of amplifiers to drive the number of the motor satisfying the conditions, in a manner so as to minimize a total number of installations, a total price, or a total installation space of the amplifier; and
   a display unit configured to display the motor that has been selected and the amplifier that has been selected.

2. The selection device according to claim 1, wherein:
   the selection information further includes a designation of any one from among the total number of installations, the total price, and the total installation space which are stored in the storage unit; and
   the amplifier selection unit selects the amplifier based on the designation.

3. The selection device according to claim 1, wherein the amplifier selection unit selects the amplifier based on a predetermined priority among the total number of installations, the total price, and the total installation space.

4. The selection device according to claim 3, wherein:
   the selection information further includes a designation of the priority; and
   the amplifier selection unit selects the amplifier based on the designation.

5. The selection device according to claim 1, wherein
the storage unit further stores, for each of the plurality of motors, at least one of a continuous rated torque, a maximum torque, a continuous rated output, or a maximum output of the motor,
the selection device further comprising:
an another motor selection unit configured to, by referring to the storage unit, select another motor the continuous rated torque, the maximum torque, the continuous rated output, or the maximum output of which is smaller than and nearest to that of the motor selected by the motor selection unit;
an another amplifier selection unit configured to, by referring to the storage unit, select one or more of the amplifiers to drive the number of the other motor, in a manner so as to minimize the total number of installations, the total price, or the total installation space of the amplifier; and
a determination unit configured to, by referring to the storage unit, determine whether or not the total number of installations, the total price, or the total installation space is reduced by changing the amplifier selected by the amplifier selection unit to the amplifier selected by the another amplifier selection unit, wherein
in a case that the total number of installations, the total price, or the total installation space is reduced by changing, respectively, the motor selected by the motor selection unit to the other motor, and the amplifier selected by the amplifier selection unit to the amplifier selected by the another amplifier selection unit, the display unit provides a display to that effect.

6. A selection method for selecting, when an operator inputs selection information, a motor, and an amplifier based on the selection information, the selection information including a number and conditions related to performance of the motor, the selection method comprising:
a storage step of storing the performance of the motor for each of a plurality of motors, and storing, for each of a plurality of amplifiers, at least one of a number of control axes, a price, or an installation space of the amplifier, and the performance of the motor drivable by the amplifier;
an input step of inputting the selection information by the operator;
a motor selection step of selecting, based on the information stored in the storage step, the motor satisfying the conditions;
an amplifier selection step of selecting, based on the information stored in the storage step, one or more of the amplifiers to drive the number of the motor satisfying the conditions, in a manner so as to minimize a total number of installations, a total price, or a total installation space of the amplifier; and
a display step of displaying the motor that has been selected and the amplifier that has been selected.

7. The selection method according to claim 6, wherein:
the selection information further includes a designation of any one from among the total number of installations, the total price, and the total installation space which are stored in the storage step; and
in the amplifier selection step, the amplifier is selected based on the designation.

8. The selection method according to claim 6, wherein
in the amplifier selection step, the amplifier is selected based on a predetermined priority among the total number of installations, the total price, and the total installation space.

9. The selection method according to claim 8, wherein:
the selection information further includes a designation of the priority; and
in the amplifier selection step, the amplifier is selected based on the designation.

10. The selection method according to claim 6, wherein
in the storage step, for each of the plurality of motors, at least one of a continuous rated torque, a maximum torque, a continuous rated output, or a maximum output of the motor is further stored,
the selection method further comprising:
an another motor selection step of selecting, based on the information stored in the storage step, another motor the continuous rated torque, the maximum torque, the continuous rated output, or the maximum output of which is smaller than and nearest to that of the motor selected in the motor selection step;
an another amplifier selection step of selecting, based on the information stored in the storage step, one or more of the amplifiers to drive the number of the other motor, in a manner so as to minimize the total number of installations, the total price, or the total installation space of the amplifier; and
a determination step of determining, based on the information stored in the storage step, whether or not the total number of installations, the total price, or the total installation space is reduced by changing the amplifier selected in the amplifier selection step to the amplifier selected in the another amplifier selection step, wherein
in a case that the total number of installations, the total price, or the total installation space is reduced by changing, respectively, the motor selected in the motor selection step to the other motor, and the amplifier selected in the amplifier selection step to the amplifier selected in the another amplifier selection step, then a display to that effect is provided in the display step.

* * * * *